United States Patent [19]
Alperovich et al.

[11] Patent Number: 5,987,318
[45] Date of Patent: *Nov. 16, 1999

[54] CALL CONFERENCE WITHIN A HOME ZONE

[75] Inventors: Vladimir Alperovich, Dallas; Eric Valentine, Plano, both of Tex.

[73] Assignee: Ericsson Inc., Research Triangle Parl, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/690,536

[22] Filed: Jul. 31, 1996

[51] Int. Cl.⁶ .................................................. H04Q 7/22
[52] U.S. Cl. .......................................... 455/416; 455/465
[58] Field of Search .................................. 455/414, 416, 455/465, 445, 458; 379/202, 204, 205

[56] References Cited

U.S. PATENT DOCUMENTS

| | | | |
|---|---|---|---|
| 4,682,367 | 7/1987 | Childress et al. | 455/416 |
| 5,191,593 | 3/1993 | McDonald et al. | 455/416 |
| 5,367,558 | 11/1994 | Gillig et al. | 379/59 |
| 5,473,605 | 12/1995 | Grube et al. | 455/416 |
| 5,524,046 | 6/1996 | Paniccia, Jr. | 379/61 |
| 5,537,610 | 7/1996 | Mauger et al. | 379/59 |
| 5,559,876 | 9/1996 | Alperovich | 379/205 |
| 5,561,840 | 10/1996 | Alvesalo et al. | 455/33.1 |
| 5,675,628 | 10/1997 | Hokkanen | 379/58 |
| 5,675,629 | 10/1997 | Raffel et al. | 379/58 |
| 5,819,180 | 10/1998 | Alperovich et al. | 455/465 |

FOREIGN PATENT DOCUMENTS

| | | |
|---|---|---|
| 0 649 266 | 10/1994 | European Pat. Off. . |
| 2 281 676 | 3/1995 | United Kingdom . |
| 94/29992 | 12/1994 | WIPO . |

OTHER PUBLICATIONS

Appleby, Malcolm. Current cellular radio offerings. IEEE Colloq. (1990) No. 081: Mobile Communications.

Primary Examiner—David D. Knepper
Assistant Examiner—M. David Sofocleous
Attorney, Agent, or Firm—Jenkens & Gilchrist P.C.

[57] ABSTRACT

A first mobile station is correlated with a second mobile station as a permitted home zone party. The second mobile station is in speech connection with another telecommunications party. In the event that the first mobile station wishes to join in on the conversation, the first mobile station simply transmits a selected service code A to the serving mobile switching center (MSC). The serving MSC retrieves the data correlating the first mobile station with the second mobile station, determines that the first mobile station is currently located within the same home zone, and conferences the first mobile station into the existing call connection involving the second mobile station by utilizing one of the call conference circuits. As an illustration, members of the same household can designate and correlate each other as permitted home zone parties. Thereinafter, whenever more than one members are within the designated home zone, and one is involved in a call connection, any other member can join in on the conversation by simply picking up a mobile station and dialing the service code.

20 Claims, 9 Drawing Sheets

CALL CONFERENCE WITHIN A HOME ZONE

BACKGROUND OF THE INVENTION

1. Technical Field of the Invention

The present invention relates to a mobile telecommunications network and, in particular, to a subscriber feature for automatically establishing a call conference within a home zone.

2. Description of Related Art

With the introduction of the Global System for Mobile (GSM) communication and the Personal Communications System (PCS), the concept of wireline telephone service and wireless telephone service has changed drastically. Instead of assigning a telephone number for a particular geographic location, in accordance with the GSM or PCS, a telephone number is assigned towards a particular subscriber. For example, instead of having a single telephone number and line to a house, each member of the household has a separate telephone number and telephone service. As a result, each subscriber is associated with a Subscriber Identity Module (SIM) card. Using an SIM card, a mobile subscriber is able to store necessary mobile subscriber information in a detachable memory unit and freely associate it with any available mobile station. Such information includes a mobile subscriber's Mobile Station Integrated Service Digital Network (MSISDN) number, International Mobile Subscriber Identity (IMSI) number, or other user specified information, such as preferred speed dialing lists or screening lists. By inserting a mobile subscriber's SIM card into a mobile station, the stored subscriber information in the inserted SIM card is available to the mobile subscriber's new terminal. As a result, the mobile subscriber is able to freely utilize any available mobile station while maintaining the same MSISDN number and subscriber feature data.

Furthermore, in order to enable the mobile subscriber to utilize the mobile station as a cordless phone while traveling within a certain geographic location, the concept of "home zone" has been introduced. If the mobile subscriber makes a call within his home zone, the mobile station functions as a conventional cordless phone and the mobile subscriber is not charged for the air time, or is charged at a significantly lower air time rate. Accordingly, within his home zone, the mobile subscriber can utilize his mobile station to originate outgoing calls without incurring expensive air time charges and without physically using a different telephone terminal, e.g., wireline terminal such as a cordless phone.

With conventional wireline telecommunications networks, a number of telephone terminals are often connected to a single telephone line. Consequently, whenever a subscriber is in speech using one of the connected terminals, other members of the same household can easily join in on the conversation by picking up a handset from other available terminals. Therefore, without requiring any sophisticated conferencing circuits or devices, three subscribers can simultaneously speak with each other. On the other hand, within mobile telecommunications networks, in order for more than two mobile subscribers to communicate with each other, three way calling or other call conferencing features must be utilized. For example, a first mobile subscriber in speech connection with a second mobile subscriber must place the second mobile subscriber on call hold and originate an outgoing call towards a third mobile subscriber. After the new outgoing call connection towards the third mobile subscriber has been established, the first mobile subscriber has to connect all the subscribers together by utilizing a call conferencing subscriber feature such as three way calling. As a result, unlike conventional wireline terminals, a mobile subscriber in the same household cannot merely walk over to another terminal in the next room, simply pick up the handset, and conveniently participate in the existing mobile conversation.

Accordingly, in a manner similar to conferencing conventional wireline terminals, there is a need for a mechanism to enable a mobile subscriber to conveniently and economically connect to an existing mobile call connection.

SUMMARY OF THE INVENTION

The present invention discloses a method and apparatus for automatically conferencing a number of mobile subscribers within the same home zone. Whenever a first mobile subscriber travels into a particular location area, data correlating the first mobile subscriber with other permitted home zone parties are copied to a visitor location register (VLR) connected with the serving mobile switching center (MSC). Thereinafter, a first mobile subscriber invokes home zone conference by dialing a particular service code or transmitting a signal to the serving MSC. The serving MSC, in turn, retrieves the stored home zone data from the VLR and determines the identity of the permitted home zone party or parties. After making such a determination, the serving MSC then determines whether particular additional mobile subscriber(s) represented by the determined identification number(s) is currently located within the same cell area as the first mobile subscriber. If the additional mobile subscriber(s) is located within the same cell area as the first mobile subscriber, a call connection between them is automatically established.

In one embodiment of the present invention, if the second mobile subscriber is already involved in speech connection with another telecommunications terminal, call conference between the first mobile subscriber, the second mobile subscriber, and the telecommunications terminal is established.

In another embodiment of the present invention, if the second mobile subscriber is idle, an outgoing call connection is originated by the serving MSC between the first mobile subscriber and the second mobile subscriber.

In yet another embodiment of the present invention, the call connection between the first mobile subscriber and the second mobile subscriber is established only if both subscribers are located within the same home zone.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
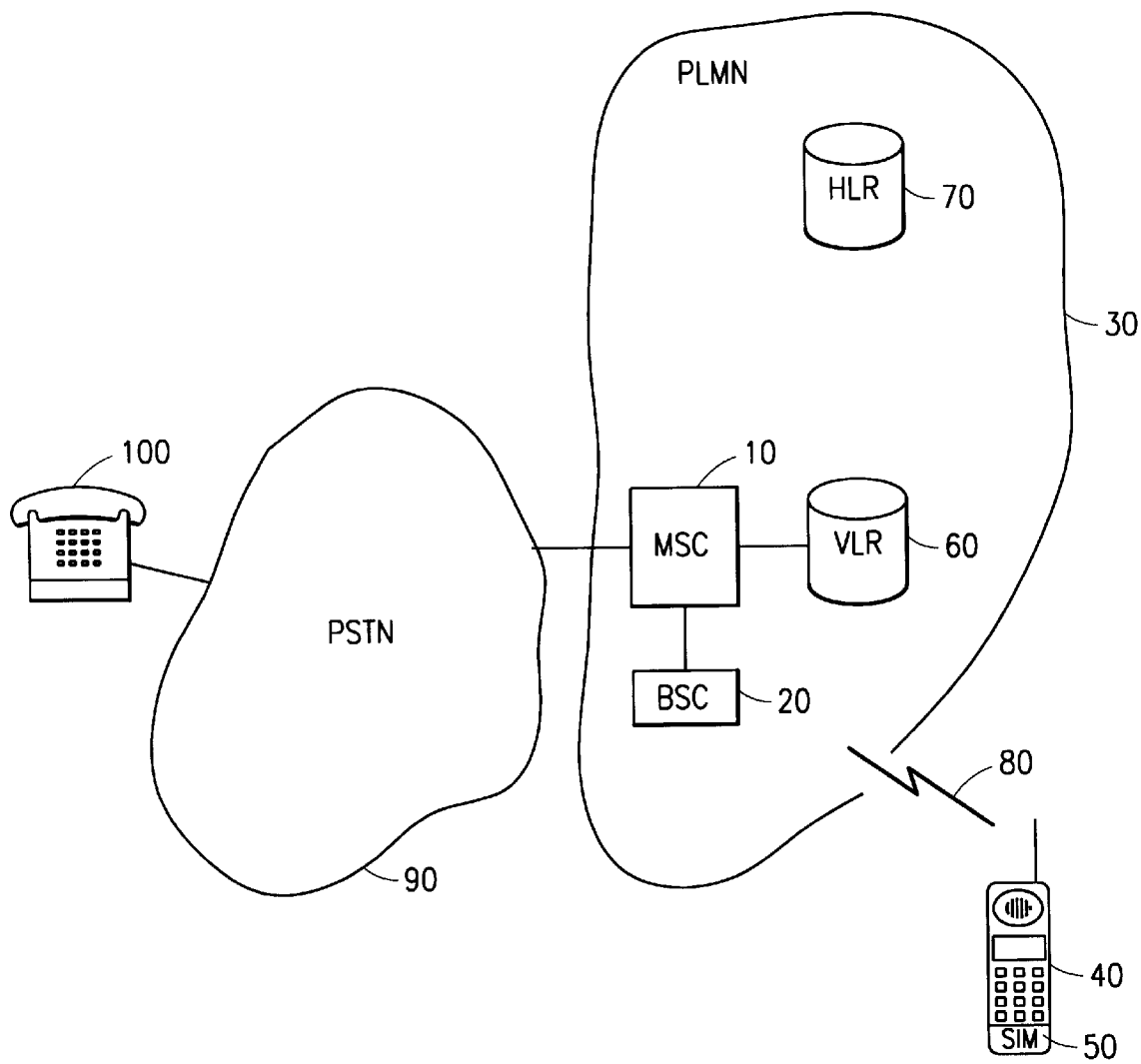
FIG. 1 is a block diagram of a mobile switching center (MSC) and a base station controller (BSC) within a Public Land Mobile Network (PLMN) providing mobile service to a mobile station.

FIG. 1 is a block diagram of a mobile switching center (MSC) 10 and a base station controller (BSC) 20 within a Public Land Mobile Network (PLMN) 30 providing mobile service to a mobile station 40. Attached to the mobile station (also known as mobile equipment) 40 is a subscriber identity module (SIM) card 50 storing subscriber specific information. Such information includes the Mobile Station Integrated Service Digital Network (MSISDN) number and the International Mobile Subscriber Identity (IMSI) number identifying the mobile subscriber and other subscriber related data including preferred speed dialing lists and screening lists. In accordance with the Global System for Mobile (GSM) or Personal Communications System (PCS) standards, by inserting a mobile subscriber's SIM card into a mobile station, the stored subscriber information in the inserted SIM card 50 is available to the mobile subscriber's terminal (hereinafter, the mobile station 40 and the SIM card 50 collectively referred to as a mobile station). As a result, the mobile subscriber is able to freely utilize any available mobile station while maintaining the same MSISDN number and subscriber feature data.

Whenever the mobile station 40 travels into a particular mobile switching center (MSC) coverage area, a visitor location register (VLR) 60 associated with the serving MSC 10 copies into its memory the relevant subscriber information from the home location register (HLR) 70 associated with that particular mobile subscriber. Thereinafter, whenever the mobile station 40 originates an outgoing call, the radio signal 80 requesting an outgoing call setup is received by the base station controller (BSC) 20 connected to the serving MSC 10. The received request is then forwarded to the serving MSC 10, who in turn, processes the call setup request with the help of the subscriber information stored in the VLR 60. If the outgoing call connection is towards a wireline terminal 100, the call setup signal, such as an Initial Address Message (IAM) signal, is then transmitted from the serving MSC 10 to the connected Public Switched Telephone Network (PSTN) 90 to establish the call connection.

Whenever the mobile station 40 makes an outgoing call, there are basically two different types of charges that are incurred for that resulting call connection. First, the mobile subscriber using the mobile station 40 is charged with the actual connection between the serving MSC 10 and the called party number. For example, if a call to a called party number, such as the wireline terminal 100, constitutes a long distance call, appropriate long distances charges will be levied to the mobile subscriber's subscription for the call connection between the serving MSC 10 and the wireline terminal 100. Second, the mobile subscriber is further charged with air time charges for providing a radio connection 80 between the mobile station 40 with the serving MSC 10 via the BSC 20. Accordingly, for mobile subscribers, there are dual charges for each call connection. On the other hand, if an outgoing call is originated from a wireline terminal, only the first type of call connection charges are incurred by the subscriber. As a result, in order to avoid incurring the above dual charges, most subscribers avoid using a mobile station if a wireline terminal is readily available.

Figure 2:
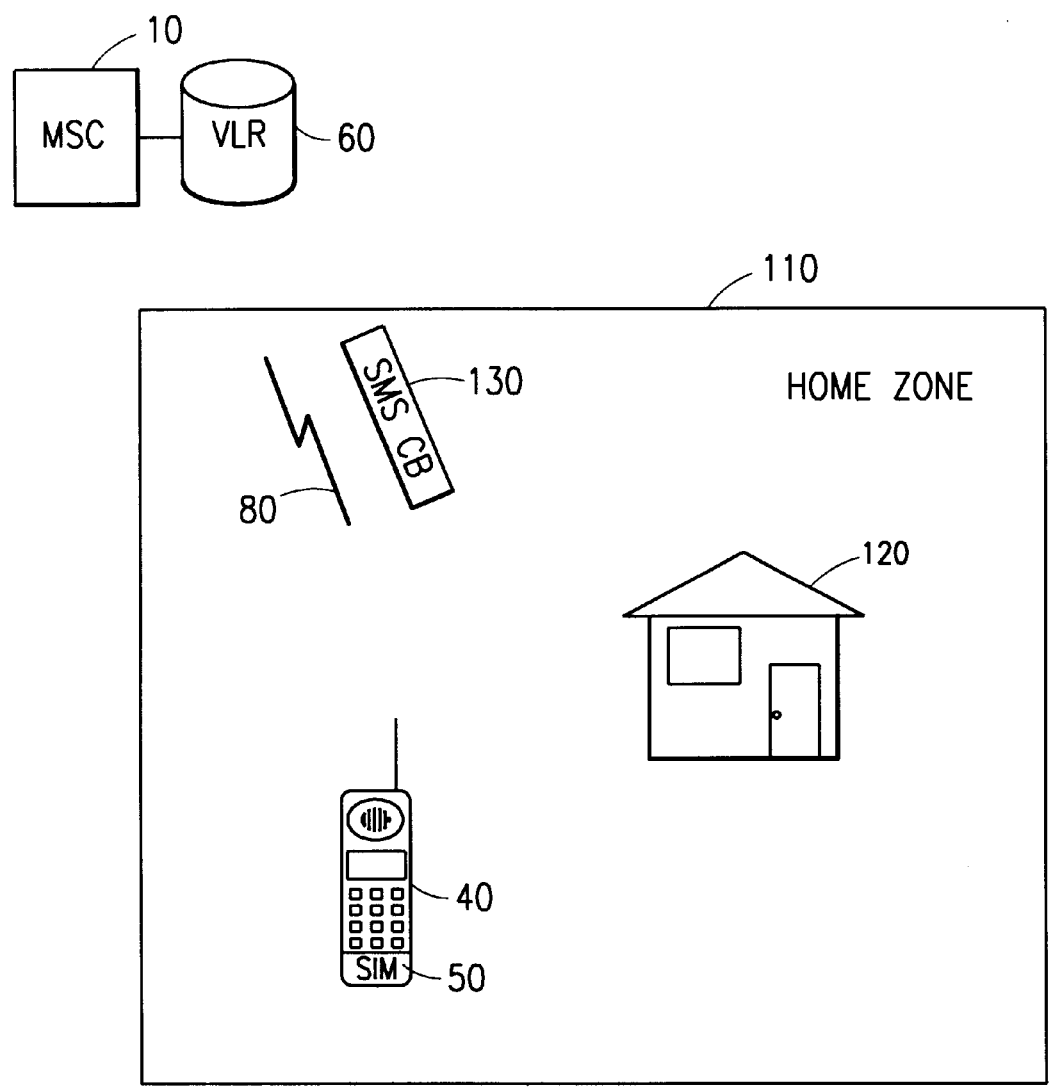
FIG. 2 is a block diagram of a mobile station originating an outgoing call while traveling within a home zone associated with that particular mobile subscriber.

In order to eliminate such charging distinctions between a wireline terminal and a mobile station, the concept of a "home zone" has been introduced. Reference is now made to FIG. 2 where a block diagram of the mobile station 40 originating an outgoing call while traveling within a home zone 110 associated with that particular mobile subscriber is shown. A register, such as the SIM card 50, stores information representing the mobile subscriber's designated home zone. Periodically, the mobile station 40 receives a Short Message Service (SMS) Cell Broadcast (CB) signal 130 indicating which zone the mobile station is currently located. The mobile station compares the zone information received over the SDCCH with the stored home zone information in the SIM card 50. If there is a match, the mobile station determines that it is within the mobile subscriber's home zone and displays a message accordingly informing the mobile subscriber.

For all calls 80 originated from or terminated toward the mobile station 40 while traveling within the home zone, the air time charges are either free or charged at a significantly lower rate. As an illustration, the mobile subscriber can make an agreement with the mobile service provider to designate a few blocks around his house 120 as his home zone 110. After making such an agreement, the mobile subscriber utilizes his mobile station 40 more as a conventional cordless phone. The mobile subscriber still has to pay for the PSTN connection charges, but the radio connection charges to the serving MSC 10 are either free or charged at a significantly lower rate. Once the mobile station 40 travels outside of the designated home zone 110, normal air time charges resume.

Accordingly, the purpose of home zone is to provide a pocket of geographic area around the mobile subscriber's home or business where the mobile subscriber is able to utilize his telecommunications service without incurring expensive air time charges. This prevents the mobile subscriber from switching to a different wireline terminal whenever he is at home or work and avoids maintaining two different bills and telephone numbers.

Figure 3:
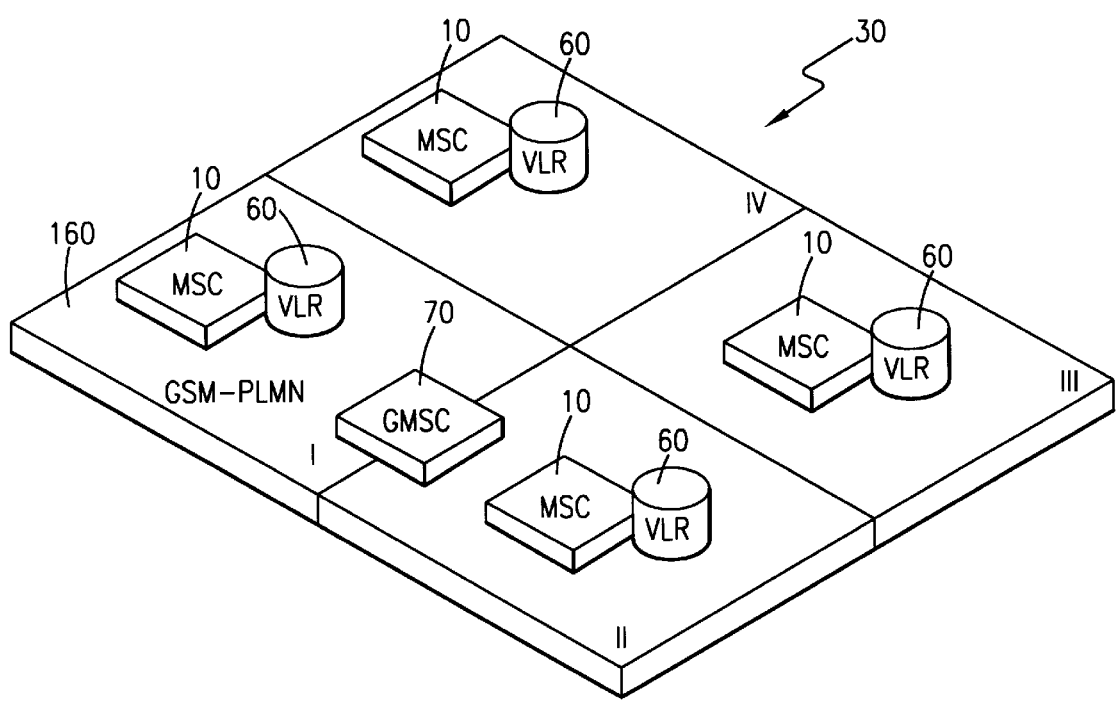
FIG. 3 is a diagram illustrating a single Public Land Mobile Network (PLMN) further comprising multiple Mobile Switching Center (MSC) areas.

Reference is now made to FIG. 3 where a layout of multiple MSC areas 160 within a particular PLMN 30 is illustrated. A PLMN network 30 is a complex configuration comprising multiple MSCs 10, VLRs 60, HLRs (not shown in FIG. 3), Gateway MSC 70 (GMSC), etc. In order to properly switch a call to a mobile station located within a particular PLMN, the correct entities need to be invoked and involved in a call process. The individual PLMN 30 may contain parts of one or more single Local Access Transport Areas (LATA). There are over three hundred LATAs presently defined throughout the United States. As shown in FIG. 3, within each LATA, there are multiple MSC/VLR areas 160 each being served by an individual MSC/VLR (usually there is a one-to-one relationship between a MSC 10 and its VLR 60 and is often referenced collectively as a MSC/VLR).

Figure 4:
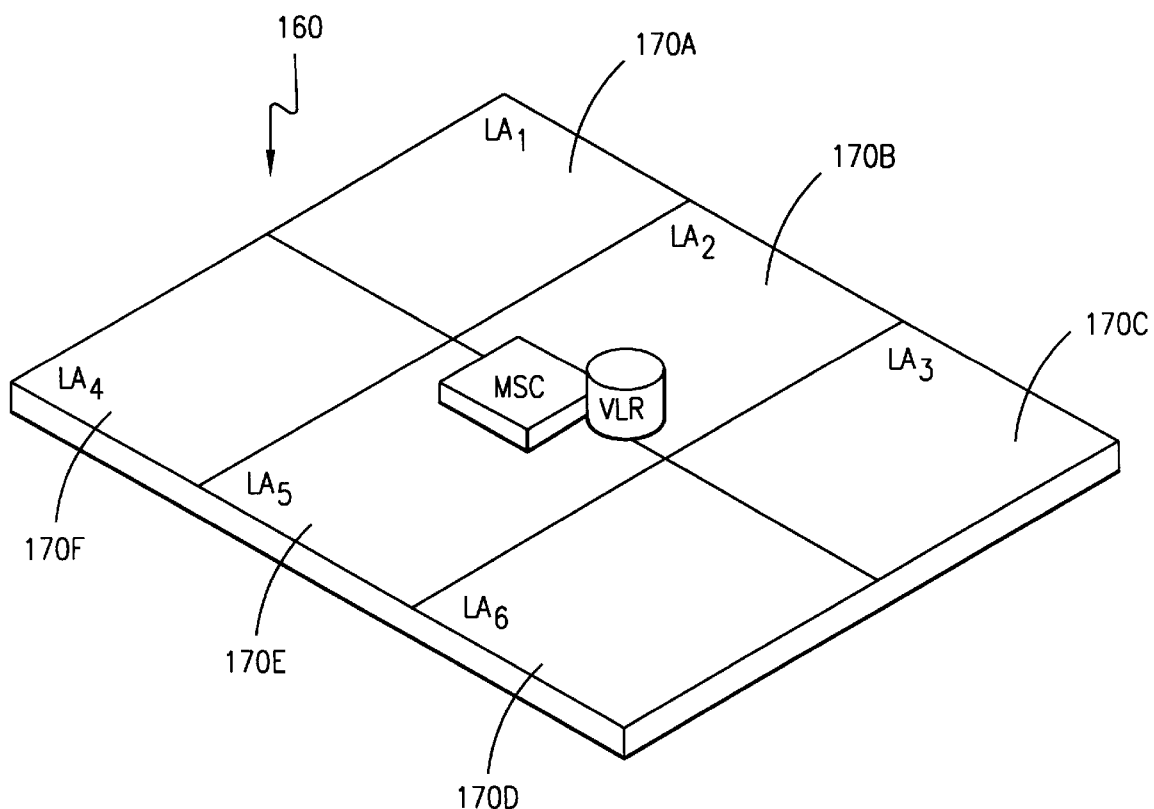
FIG. 4 is a diagram illustrating a single MSC further comprising multiple Location Areas (LA)

FIG. 4 illustrates multiple Location Areas 170a–170f within a particular MSC area 160. A Location Area is a part of the MSC service area in which a mobile station may move freely without updating location information to the MSC/VLR serving that Location Area. Therefore, a Location Area is the area where a paging message is broadcast to find the called mobile station. A Location Area Identity (LAI) which identifies each Location Area is used by the mobile network to search for a mobile station in active state.

Figure 5:
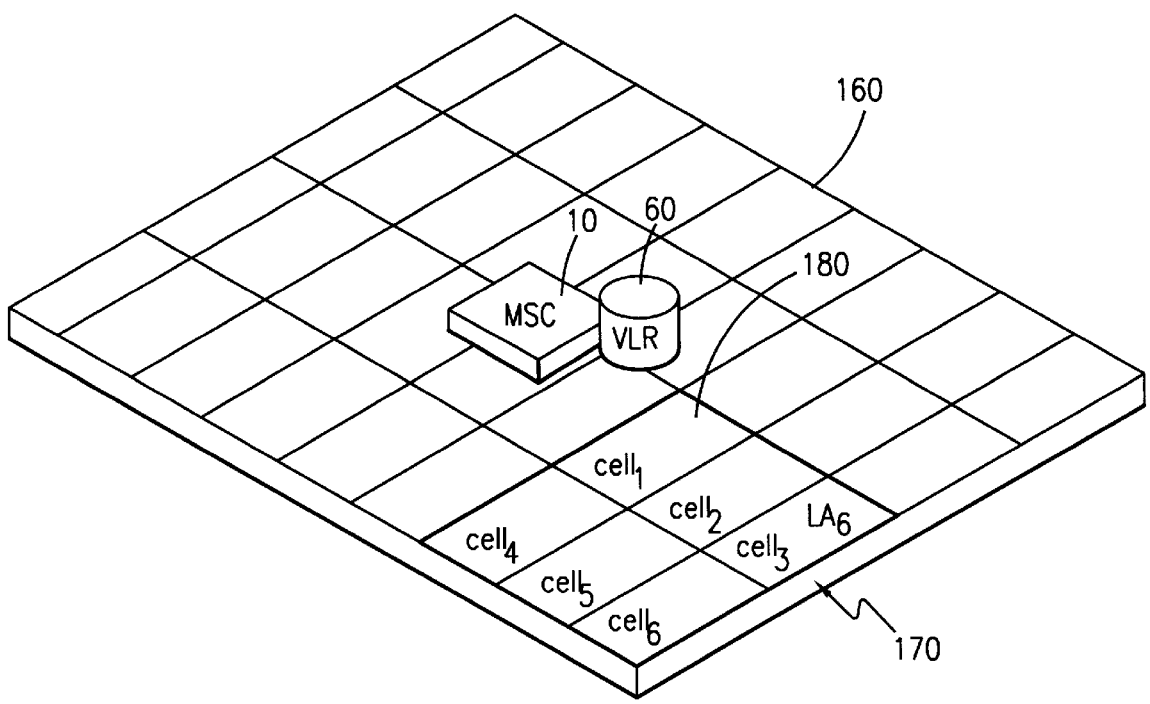
FIG. 5 is a diagram illustrating a single Location Area further comprising multiple Cell Areas.

Referring to FIG. 5, each Location Area 170 within a particular MSC coverage area 160 is further divided into multiple Cell Areas 180. Again, these Cell Areas within the Location Area 180 are served by the same MSC 10 and VLR 60. The serving mobile network identifies a particular radio coverage area known as a Cell Area 180 using a Cell Global Identity (CGI). Different Cell Areas 180 within a single Location Area 160 are distinguished using a Base Station Identity Code (BSIC) assigned to each serving base station.

As a result, each mobile subscriber can make an agreement with the mobile service provider to designate any one of the above coverage areas to be his home zone. Typically, a cell area covering the mobile subscriber's home or work is designated as the home zone. As a result, as long as the mobile subscriber utilizes his mobile service within his designated cell area, his air time charges are reduced.

Even though, as described above, the concept of home zone is very analogous to a conventional wireless system, there are certain functional differences. Unlike a conventional wireless system connected to a wireline connection, currently it is not possible for another subscriber within the same household to simply pickup another available PCS or GSM terminal and join in on an existing mobile connection. If a first mobile subscriber is in speech connection with another telecommunications terminal, a second mobile subscriber standing next to the first mobile subscriber cannot connect to the existing mobile connection without utilizing one of the call conferencing features. For example, the first mobile subscriber has to place the existing call connection on call hold, originate an outgoing call connection towards the second mobile subscriber, and upon answering the outgoing call connection, bridge the first call connection with the newly established outgoing call connection using one of the call conferencing features. On the other hand, within a conventional wireline network, one can merely pickup another available terminal tied to the same wireline connection and be connected to the existing call connection. Accordingly, there is a need for a mechanism to enable the second mobile subscriber to conveniently and economically connect to the first mobile subscriber's existing call connection.

Figure 6A:
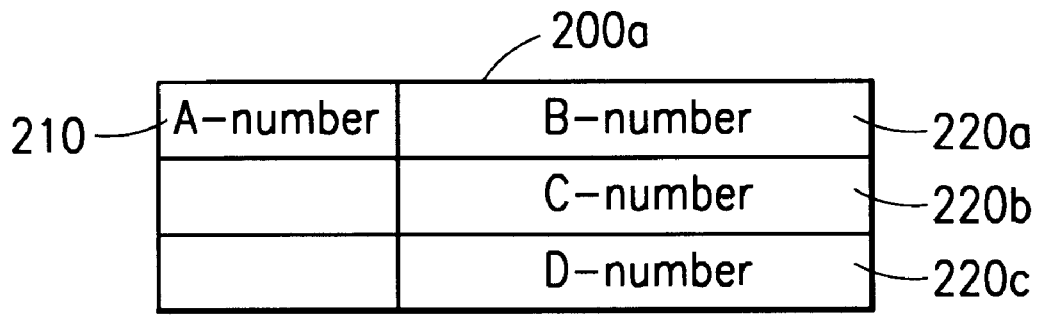
FIG. 6A is a diagram illustrating an exemplary data structure for storing permitted home zone parties for A-number.

In accordance with the teachings of the present invention, FIG. 6A is a diagram illustrating an exemplary data structure for a data record 200a storing data correlating a number of home zone parties 220a–c with a first mobile subscriber. The data record 200 storing the correlation data is stored at a home location register (HLR) associated with the first mobile subscriber represented by the A-number 210. The correlated home zone parties represented by the B-number 220a, the C-number 220b, and the D-number 220c are mobile subscribers who are permitted to conference with the first mobile subscriber without dialing the assigned A-number.

Figure 6B:
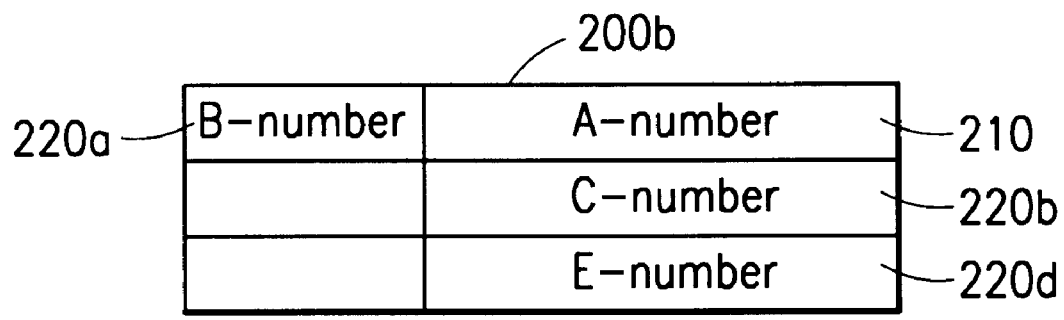
FIG. 6B is a diagram illustrating an exemplary data structure for storing permitted home zone parties for B-number.

Reference is now made to FIG. 6B also illustrating an exemplary data structure for a data record 200b storing data correlating a number of home zone parties with a second mobile subscriber represented by the B-number 220a. As described above, the A-number 210, the C-number 220b, and the E-number 220d are home zone parties that are permitted to home zone conference with the second mobile subscriber without dialing the B-number 220a. Similarly, the data record 200b is stored at a home location register (HLR) associated with the second mobile subscriber. The above identification number representing a particular mobile subscriber may include the assigned MSISDN number or the IMSI number.

Figure 7:
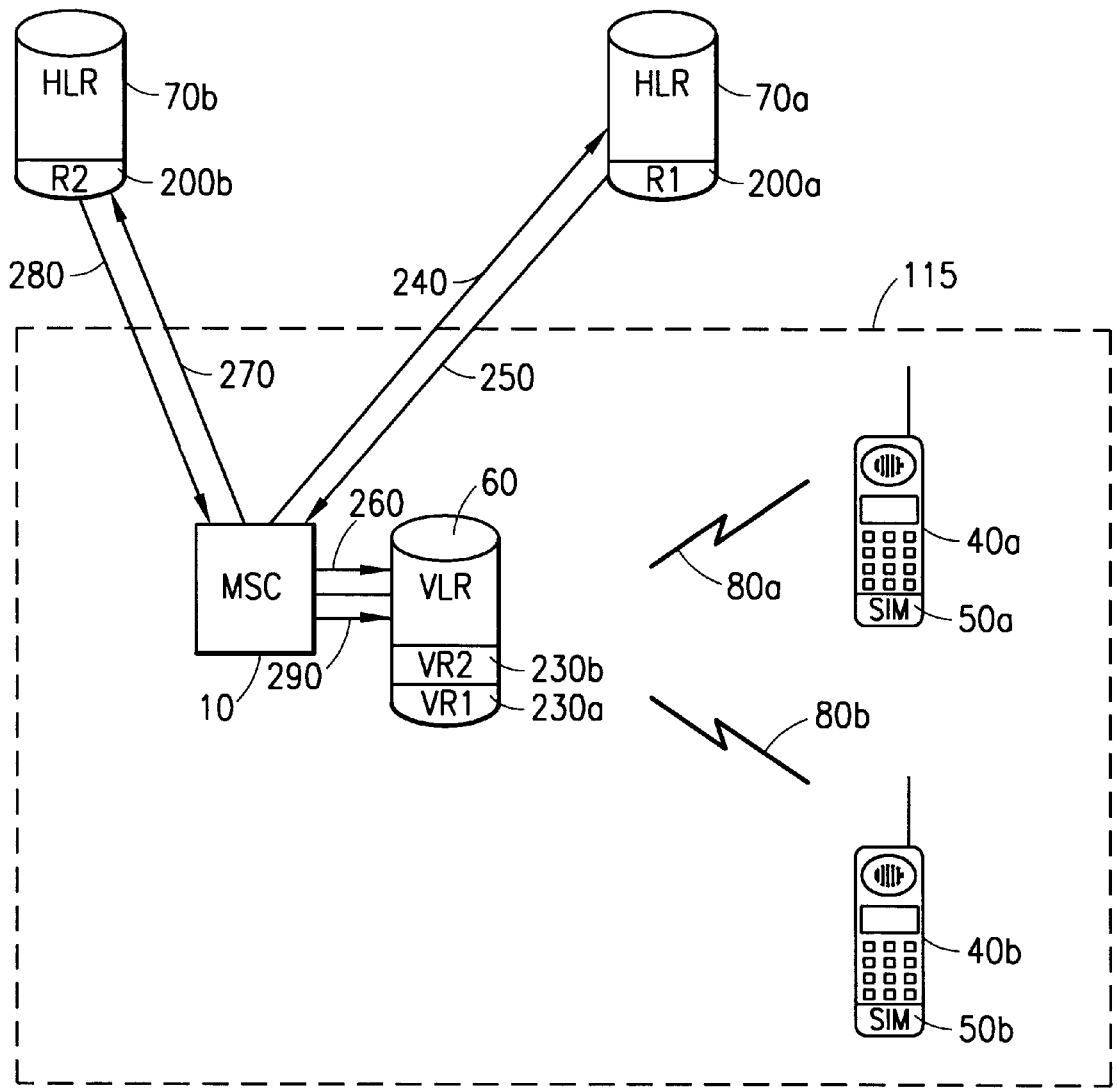
FIG. 7 is a block diagram illustrating mobile stations performing location update with associated home location registers (HLRs)

Reference is now made to FIG. 7 where a block diagram of mobile stations performing location update from a particular mobile switching center (MSC) service area 115 is shown. Whenever the first mobile station 40a travels into a new MSC coverage area, the International Mobile Subscriber Identity (IMSI) number associated with the SIM card 50a is transmitted to the serving MSC 10 via a radio signal 80a. Utilizing the received IMSI number, the serving MSC 10 performs a location update towards the home location register (HLR) 70a associated with the received IMSI number. The location update is performed to inform the serving HLR 70a of the mobile subscriber's new location and to copy requisite subscriber information to the connected visitor location register (VLR) 60. Accordingly, a location update signal 240 is transmitted from the serving MSC 10 to the serving HLR 70a with the mobile subscriber's new location. The HLR 70a, in turn, returns requisite subscriber information, such as charging data and application feature data, to the serving MSC 10 via another signal 250. In accordance with the teachings of the present invention, the data (R1) 200a representing permitted home zone parties for this particular mobile subscriber are further transmitted to the serving MSC 10. The serving MSC 10, in turn, stores the received home zone party data at the connected VLR 60 as illustrated by a data record (VR1) 230a (signal link 260). In a similar manner, when the mobile station 40b associated with the SIM card 50b travels into the same MSC coverage area and registers for the first time (radio link 80b), the serving MSC 10 once again performs a location update with an HLR 70b associated with the mobile station 40b. A location update signal 270 along with the mobile station's new location is transmitted to the serving HLR 70b. The serving HLR 70b, in turn, transmits the requisite subscriber information, including the home zone party data and the assigned MSISDN number, back to the serving MSC 10 via another signal 280. The serving MSC 10 again stores the received home zone party data at the connected VLR 60 as illustrated by the stored data record (VR2) 230b (signal link 290). As a result, data correlating the first mobile station with its permitted home zone parties and the second mobile station with its permitted home zone parties are downloaded to the VLR 60 connected to the serving MSC 10.

Figure 8:
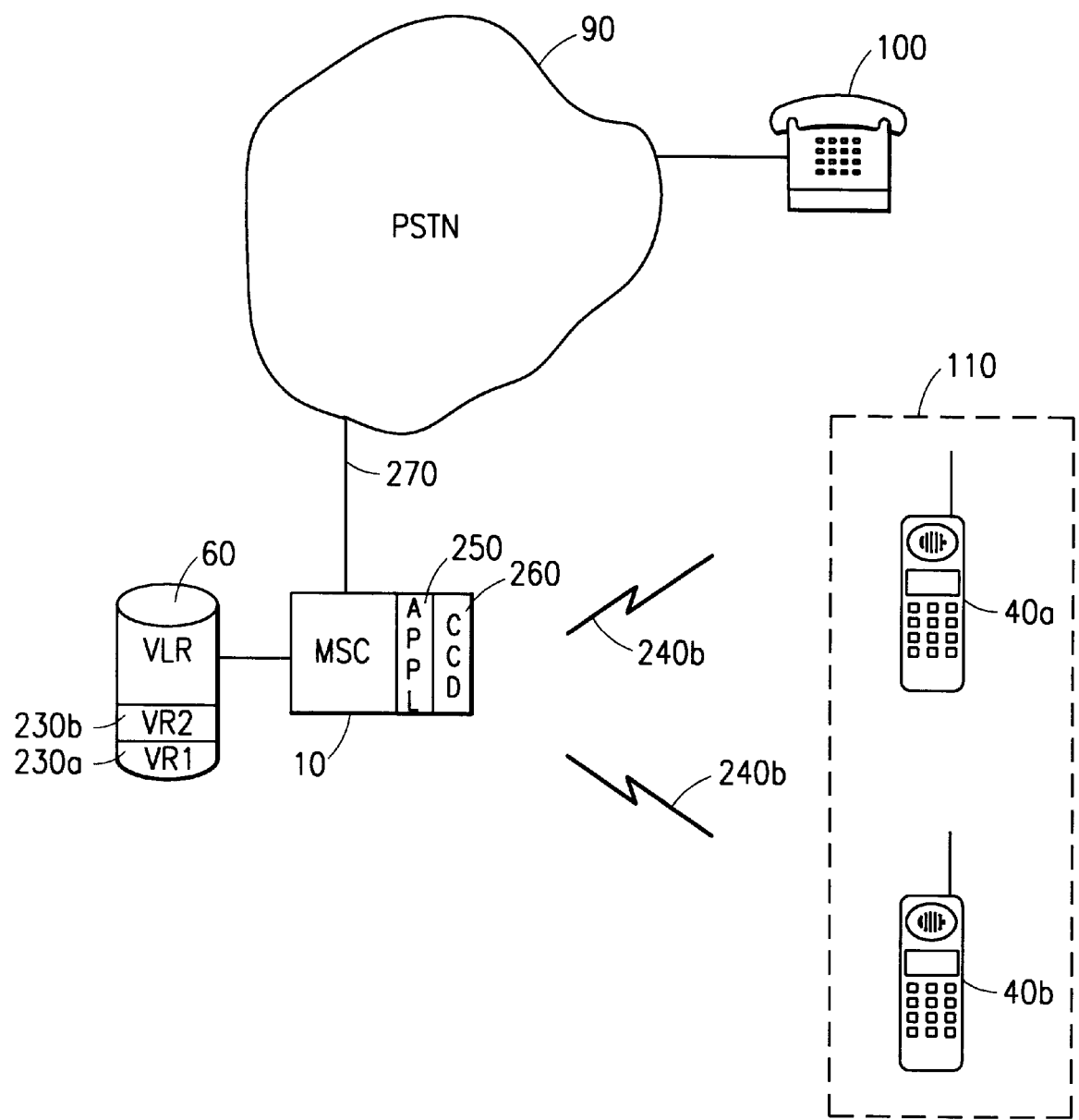
FIG. 8 is a block diagram illustrating a first mobile station automatically conferencing into an existing mobile call connection involving a second mobile station.

FIG. 8 is a block diagram illustrating the first mobile station 40a automatically conferencing into an existing mobile call connection involving the second mobile station 40b. The second mobile station 40b is in speech connection with another telecommunications terminal, such as a wireline terminal 100. The first mobile station 40a wishes to join in on the existing call connection between the second mobile station 40b and the wireline terminal 100. This would be analogous to a family member picking up another wireline terminal to join in on the existing call connection within the same household. Accordingly, the first mobile station 40a either presses a pre-defined key or a particular service code. The serving MSC 10 recognizes that the indication 240b received from the first mobile station 40a is to invoke home zone conference and, accordingly, retrieves the home zone party data (VR1) 230a stored in the connected VLR 60. Upon retrieving the home zone party data 230a, an application module 250 associated with the serving MSC 10 determines that the B-number, C-number, and D-number (not shown in FIG. 8, refer to FIG. 6A) are permitted to home zone conference with the first mobile station 40a. Consequently, the application module 250 then determines whether any of the permitted home zone parties are currently located within the same home zone 110. In response to an affirmative determination that the second mobile station 40b represented by the B-number is currently located within the same home zone 110, the serving MSC 10 ascertains the current call connection 270 connecting the second mobile station 40b with the wireline terminal 100. Upon determining the identity of the call connection, using circuitry, such as a Call Conference Device (CCD) 260 manufactured by Telefonaktiebolaget L. M. Ericsson, the first mobile station 40a is bridged into the existing call connection 270 and a conference call connection between the first mobile station 40a, the second mobile station 40b, and the wireline terminal 100 is accordingly established.

As another embodiment of the present invention, if the determined home zone party is currently not in speech connection and idle, an outgoing call connection is automatically initiated towards the second mobile station 40b and a new call connection connecting the first mobile station 40a and the second mobile station 40b is established. Furthermore, since the application module 250 already knows that the second mobile station 40b is already being served by the same MSC 10, no Initial Address Message (IAM) requesting call connection will be transmitted over the existing Public Switched Telephone Network (PSTN). In other words, the serving MSC 10 or the connecting PSTN will not interrogate the HLR associated with the second mobile station 40b to determine the location of the mobile station 40b and to request a roaming number. A call connection will be made directly between the first mobile station 40a and the second mobile station 40b exclusively through the serving MSC 10.

Figure 9A:
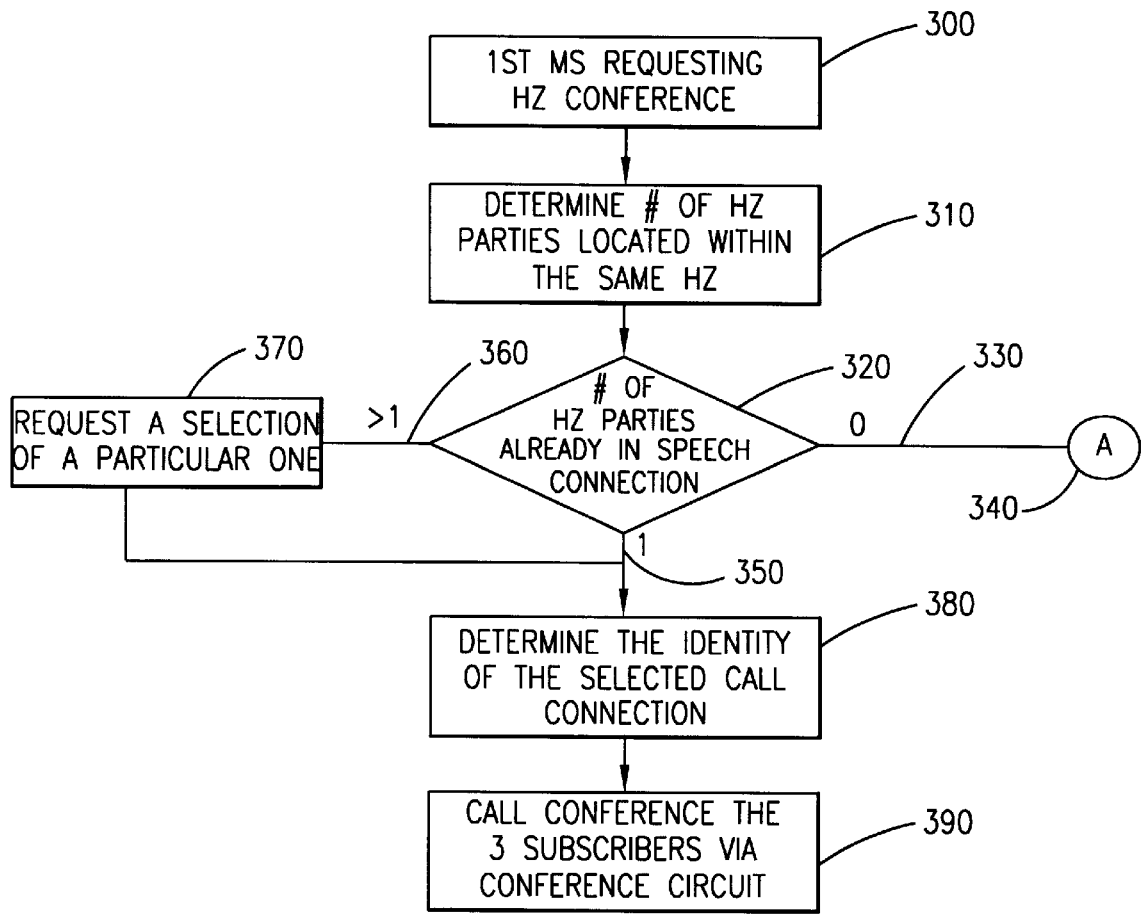
FIGS. 9A and 9B are flowcharts describing the steps taken for establishing home zone conference within a mobile telecommunications system.
Figure 9B:
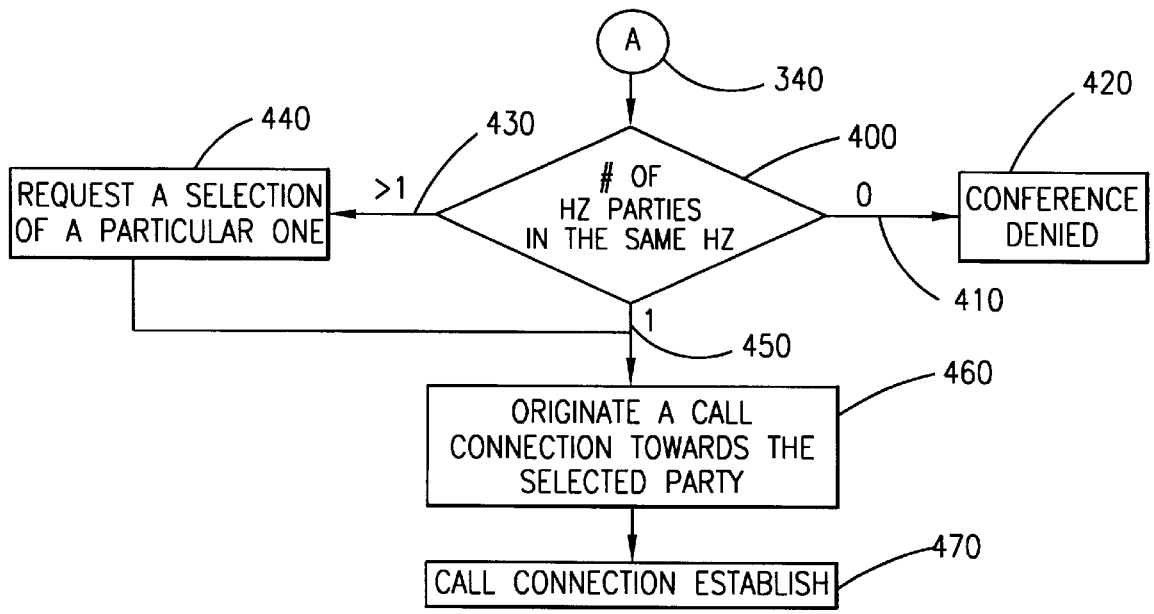

FIGS. 9A and 9B are flowcharts describing the steps performed for establishing home zone conference within a mobile telecommunications sytem. The first mobile station requests home zone conference by transmitting an indication to the serving MSC at step 300. Such an indication includes a particular service code and/or a function key (e.g., SEND key). The serving MSC, by retrieving and evaluating the home zone party data stored in the connected VLR, determines the number of home zone parties that are currently located within the same home zone at step 310. After determining the identities of the home zone parties that are located within the same home zone, the number of that particular home zone parties that are currently in speech connection is determined at step 320. If there is no home zone party currently in speech connection, the decision node A 340 is taken (decision link 330). If there is more than one home zone party currently involved in speech connection (decision link 360), the first mobile station is informed of that fact with a request for it to select a particular one at step 370. Such a request can be made by transmitting Short Message Service (SMS) or Unstructured Supplementary Service Data (USSD) messages to the first mobile station requesting the mobile subscriber to select and transmit back another SMS or USSD message containing the selection. The request can further be made by generating an announcement verbally informing the mobile subscriber with the identification number, such as the MSISDN number, associated with each determined home zone party and request the mobile subscriber to select one. As a result, after receiving such a selection from the mobile station, the step 380 is performed. Similarly, if there is only one particular home zone party currently in speech connection (decision link 350), the step 380 is also performed.

Accordingly, at step 380, the serving MSC determines the call identity of the call connection connected to the selected home zone party. After ascertaining the call identity of such a connection, the serving MSC conferences the first mobile station with the selected home zone party by bridging into the existing call connection using one of the call conference circuits at step 390. As an option, an intrusion tone may be generated on the existing call connection to alert the relevant parties that another home zone party is about to conference into the conversation.

Reference is now made to FIG. 9B further illustrating the steps performed when there are no home zone parties in speech connection. If there is no home zone party to conference into at node A 340, the serving MSC again makes a determination as to how many home zone parties are currently located within the same home zone. If there is no permitted home zone party currently located within the same home zone (decision link 410), the request is denied and the mobile subscriber is accordingly notified (e.g., denial tone). If there are more than one home zone party currently located within the same home zone (decision link 430), in a manner similar to step 370, the available home zone parties are informed to the mobile subscriber at step 440 with a request to select a particular one. After receiving the selection from the mobile subscriber, the step 460 is performed. Lastly, if there is only one permitted home zone party located within the same home zone (decision link 450), the step 460 is also performed. At step 460, the serving MSC originates a call connection towards the selected home zone party thereby establishing a call connection between the first mobile station and the selected home zone party. As described above, the call connection setup request message or signal does not get transmitted out of the serving MSC because the serving MSC already knows that the called party is located within the service area and locally accessible. Accordingly, without transmitting a setup message or interrogating the HLR associated with the called party, a direct call connection is established by the serving MSC. Effectively, this mechanism provides the first mobile station with an intercom service to communicate with a particular home zone party.

Using the above mechanism, a selected group of mobile subscribers can join in on an existing mobile call connection by simply picking up his mobile phone and dialing a selected service code or transmitting a signal. Such a signal includes a SMS or USSD message, or Supplementary Service Procedures. The serving MSC automatically retrieves and determines which of the home zone parties are currently located within the same home zone, which of them are currently involved in speech connection, and automatically conferences the requesting mobile station with one of the existing call connection. Accordingly, analogous to wireline terminals, a mobile subscriber may simply pick up his mobile phone and conveniently bridge into someone else's conversation.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for connecting a mobile cellular subscriber into an existing speech connection within a mobile cellular telecommunications network, said method comprising the steps of:

receiving an indication from a first cellular mobile station to connect into an existing speech connection;

retrieving an identification number representing a second mobile cellular station whose speech connections said first mobile cellular station is allowed to connect;

determining whether a second mobile cellular station associated with said retrieved identification number is located within the same area as said first mobile cellular station;

identifying an existing speech connection between said second mobile cellular station and a telecommunication terminal; and bridging said first mobile cellular station into said identified existing speech connection between said second mobile cellular station and said telecommunication terminal in response to an affirmative determination that said first mobile cellular station and said second mobile cellular station are within the same area of said mobile cellular telecommunication network, wherein said bridging step is performed within said mobile cellular telecommunications network.

2. The method of claim 1, wherein:

said identification number retrieving step includes the step of retrieving a plurality of identification numbers representing a plurality of second mobile cellular stations whose speech connections into which said first mobile cellular station is allowed to connect;

said determining step includes the step of determining whether any of said plurality of second mobile cellular stations associated with said retrieved identification numbers are located within the same area in which said first mobile cellular station is located;

said identifying step includes the step of identifying said plurality of second mobile cellular stations associated with said retrieved identification numbers which are each in an existing speech connection with a telecommunication terminal; and said bridging step includes the step of bridging said first mobile cellular station into one of said existing speech connections.

3. The method of claim 2, further including the step of selecting one of said existing speech connections by a user of said first mobile cellular station, and wherein said bridging step comprises the step of bridging said first mobile cellular station into said selected speech connection.

4. The method of claim 1 wherein said step of receiving said indication comprises the step of receiving a service code from said mobile station.

5. The method of claim 1 wherein said step of determining whether said second mobile station is located within the same area further comprises the step of determining whether said first and second mobile stations are being served by the same mobile switching center.

6. The method of claim 1 further comprising the initial steps of:

performing a location update from a mobile switching center (MSC) serving said first mobile station towards a home location register (HLR) associated with said first mobile station; and copying said identification number from said HLR to a visitor location register (VLR) connected to said MSC.

7. The method of claim 1 wherein said identification number comprises a Mobile Station Integrated Service Digital Network (MSISDN) number associated with said mobile subscriber.

8. A method for automatically connecting a mobile cellular station into an existing speech connection within a mobile cellular telecommunications network, said method comprising the steps of:

establishing a first speech connection between a first mobile cellular station and a telecommunications terminal;

receiving an indication from a second mobile cellular station to automatically connect into an existing speech connection;

retrieving an identification number of one or more particular mobile cellular stations that are associated with said second mobile cellular station as a home zone party;

determining that at least one of said retrieved identification number represents said first mobile cellular station;

determining whether said first mobile cellular station is located within the same cell area of the mobile cellular telecommunications network as said second mobile cellular station; and bridging said second mobile cellular station into said first speech connection between said first mobile cellular station and said telecommunications terminal in response to an affirmative determination that said first and second mobile cellular stations are located within the same cell area of the mobile cellular telecommunication network.

9. The method of claim 8 wherein said step of receiving an indication comprises the step of receiving a service code from said second mobile subscriber.

10. The method of claim 8 wherein said step of retrieving said identification number comprises the step of retrieving a Mobile Station Integrated Service Digital Network (MSISDN) number assigned to said first mobile station.

11. The method of claim 8 wherein said cell area further comprises a home zone assigned to said first mobile station and said second mobile station.

12. The method of claim 8 wherein said step of bridging said first mobile cellular station into said first speech connection is performed by a mobile switching center (MSC) serving said first mobile cellular station and said second mobile cellular station.

13. The method of claim 8 further comprising the initial steps of:

performing a location update from a mobile switching center (MSC) serving said first mobile station towards a home location register (HLR) associated with said first mobile station; and copying said identification number from said HLR to a visitor location register (VLR) connected to said MSC.

14. The method of claim 8 wherein said mobile station further comprises:

mobile equipment; and a subscriber identity module (SIM) card attached to said mobile equipment, said SIM card representing a particular mobile subscriber.

15. A system for connecting a mobile cellular subscriber into an existing speech connection within a mobile cellular telecommunications network, comprising:

means for receiving an indication from a first mobile cellular subscriber to connect into an existing speech connection;

means for retrieving an identification number representing a second mobile cellular subscriber, said second mobile cellular subscriber being correlated with said first mobile cellular subscriber as a permitted home zone party;

means for determining whether said second mobile cellular subscriber is being served by the same mobile switching center (MSC) serving said first mobile cellular subscriber;

means for identifying an existing speech connection between said second mobile cellular subscriber and a telecommunication terminal; and means for bridging said first mobile cellular subscriber into said identified existing speech connection between said second mobile cellular subscriber and said telecommunication terminal, in response to an affirmative determination that said first mobile cellular subscriber and said second mobile cellular subscriber are being served by the same MSC, said bridging being performed in said mobile cellular telecommunications network.

16. The system of claim 15, wherein:

said identification number retrieving means retrieves a plurality of identification numbers, each representing a different second mobile cellular subscriber, said second mobile cellular subscribers being correlated with said first mobile cellular subscriber as permitted home zone parties;

said determining means determines whether each said second mobile cellular subscriber is being served by the same MSC serving said first mobile cellular subscriber;

said identifying means identifies existing speech connections involving said second mobile cellular subscribers; and said bridging means connects said first mobile cellular subscriber into one of said identified existing speech connections.

17. The system of claim 16, further including:

a means for selecting a particular existing speech connection for bridging into by said first mobile cellular subscriber.

18. The system of claim 15 further comprising:

means for performing a location update from said MSC towards a home location register (HLR) associated with said first mobile subscriber;

means for transmitting said identification number representing said second mobile subscriber from said HLR to said MSC; and means for storing said transmitted identification number at a Visitor Location Register (VLR) connected to said MSC.

19. The system of claim 15 wherein said means for determining whether said second mobile subscriber is being served by said same MSC further comprises means of determining whether said first mobile subscriber and said second subscriber are in the same home zone.

20. The system of claim 15, wherein:

said indication receiving means receives said indication from said first mobile cellular subscriber through a mobile cellular station;

said means for identifying an existing speech connection of said second mobile cellular subscriber identifies an existing speech communication involving a mobile cellular station of said second mobile cellular subscriber; and said bridging means connects said mobile cellular station of said first mobile cellular subscriber into said existing speech communication involving said mobile cellular station of said second mobile cellular subscriber.

* * * * *